April 3, 1951  W. W. EDSON  2,547,452
ELECTRICAL DISTRIBUTION SYSTEM
Filed June 16, 1949  2 Sheets-Sheet 1

WITNESSES:
E. A. McCloskey
Nw. C. Groome

INVENTOR
William W. Edson.
BY C. L. Friedman
ATTORNEY

April 3, 1951   W. W. EDSON   2,547,452
ELECTRICAL DISTRIBUTION SYSTEM
Filed June 16, 1949   2 Sheets-Sheet 2

WITNESSES:
E. A. McCloskey
Wm. L. Groane

INVENTOR
William W. Edson.
BY C. L. Friedman
ATTORNEY

Patented Apr. 3, 1951

2,547,452

UNITED STATES PATENT OFFICE 2,547,452

ELECTRICAL DISTRIBUTION SYSTEM

William W. Edson, Auburndale, Mass., assignor to Westinghouse Electric Corporation, East Pittsburgh, Pa., a corporation of Pennsylvania Application June 16, 1949, Serial No. 99,495

12 Claims. (Cl. 171—97)

This invention relates to electrical distribution systems, and it has particular relation to a system wherein a network or loop circuit is supplied with electrical energy from multiple sources of electrical energy.

In accordance with the invention, a distribution unit is provided which includes a plurality of load buses connected for energization from a common source of electrical energy. For example, two load buses may be connected in parallel through an impedance unit for energization from a source of energy. The impedance unit is so constructed that negligible impedance is offered to current supplied by the source to the load buses in parallel. However, the impedance unit offers substantial impedance to current supplied by the source to one load bus alone, and to current flowing between the load buses.

In accordance with a further aspect of the invention, a plurality of distribution units are associated in a distribution system. The load buses of the distribution units are connected in one or more network or loop circuits. For example, all of the load buses may be connected in series in a loop circuit. As a further example, a first load bus in each of the distribution units may be connected in series in a first loop circuit, and the remaining load buses may be connected in series in a second loop circuit.

The provision of a plurality of load buses in each of the distribution units in association with the impedance unit for each distribution unit makes possible the provision of a distribution system wherein negligible impedance is offered to load currents, but wherein substantial impedance is offered to fault currents. The restriction of fault current materially adds to the flexibility of the system and permits the adoption of circuit interrupters and other components having reasonably low current ratings.

It is, accordingly, an object of the invention to provide an improved distribution unit wherein a plurality of load buses are connected for energization from a source of electrical energy through an impedance unit.

It is a further object of the invention to provide an improved electrical distribution system wherein pairs of load buses are provided, each of the pairs being energized from a common source of electrical energy.

It is an additional object of the invention to provide a distribution unit wherein a plurality of load buses are connected in series through a plurality of mutually-coupled impedance parts, the impedance parts also connecting the load buses in parallel to source of electrical energy.

It is a still further object of the invention to provide an electrical distribution system wherein a loop circuit is energized from a plurality of distribution units, each similar to that set forth in the preceding paragraph.

Other objects of the invention will be apparent from the following description, taken in conjunction with the accompanying drawings, in which.

Figure 1:
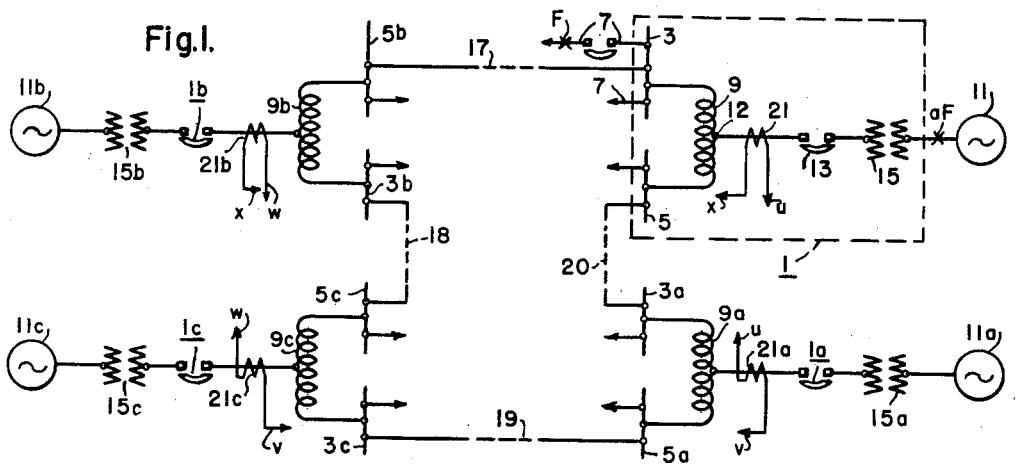
Figure 1 is a schematic view in single line of an electrical distribution system embodying the invention.

The electrical distribution system of Figure 1 may be a direct-current system or an alternating-current system operating at any desired frequency. However, the invention is particularly suitable for an alternating-current system, and for the purposes of discussion, it will be assumed that the system of Fig. 1 is a single-phase alternating-current system operating at a frequency of sixty cycles per second.

The system of Fig. 1 includes a distribution unit 1 which has a plurality of load buses associated therewith. In a preferred embodiment of the invention, two load buses 3 and 5 are provided for the distribution unit 1. Each of the load buses may be connected to suitable loads through connections 7.

The load buses 3 and 5 are connected in parallel through an impedance unit 9 to a suitable source of electrical energy which may be represented by an alternating-current generator 11. The impedance unit is so designed that it offers negligible impedance to the flow of load current from the generator 11 in parallel to the load buses 3 and 5. For present purposes, it will be assumed that the impedance unit 9 is represented by a winding having its terminals connected, respectively, to the load buses 3 and 5. A centrally disposed tap 12 on the winding is connected through a circuit interrupter 13 and a transformer 15 to the generator 11.

It may be well to pause at this point to consider the operation of the winding 9. It will be understood that the two halves of the winding 9 on opposite sides of the tap 12 are mutually coupled to each other. Under normal conditions of operation, substantially equal loads are connected to the load buses 3 and 5, and substantially equal currents flow in parallel to the load buses from the generator 11. The parallel currents supplied to the load buses flow through their respective halves of the winding 9 and produce magnetomotive forces which are in opposition to each other. Since these magnetomotive forces are in opposition, substantially the only impedance offered to the flow of currents is that represented by the resistance of the halves of the winding. Since such resistance is extremely low, negligible impedance is offered to the flow of load currents to the load buses 3 and 5.

Let it be assumed next that the currents supplied to the load buses 3 and 5 from the generator 11 are unbalanced because of the occurrence of a fault F on one of the load circuits associated with the load bus 3. A larger current now flows through the upper half of the winding 9 than that through the lower half of the winding. The difference between these two currents, which flows through the upper half of the winding, produces a magnetomotive force which is not opposed by a corresponding magnetomotive force in the lower half of the winding. Consequently, the upper half of the winding 9 offers a substantial impedance to the flow of current from the generator 11 to the fault F.

Let it be assumed next that the distribution unit 1 is located in a system capable, under certain conditions, of establishing a potential difference between the load buses 3 and 5. As a result of this potential difference, current will tend to flow between the load buses through the entire winding 9. Since the magnetomotive forces in the two halves of the winding produced by such current are additive, the winding offers substantial impedance to the flow of current between the load buses.

It will be understood that the winding 9 may be constructed in any suitable manner to provide the desired reactance values. For example, it may have a soft iron core and may be immersed in oil for insulating purposes, if so desired.

In a complete electrical distribution system, several distribution units similar to the unit 1 and several generators similar to the generator 11 may be employed. Thus, in Fig. 1, three additional distribution units 1a, 1b and 1c and three additional generators 11a, 11b and 11c are employed. It will be understood that the construction of all of the distribution units and of the generators and their association may be similar to the construction and association of the distribution unit 1 and the generator 11. For this reason, components of the distribution units 1a, 1b and 1c will be identified by the reference character employed for the corresponding component of Fig. 1 followed by the proper identifying letter a, b or c.

The load buses of the distribution units may be connected to provide a resultant network or loop circuit. In Fig. 1, all of the load buses are connected in series in a loop circuit. To this end, a tie circuit 17 connects the load buses 3 and 5b. A tie circuit 18 connects the load buses 3b and 5c. A tie circuit 19 connects the load buses 3c and 5a. Finally, a tie circuit 20 connects the load buses 5 and 3a. By inspection of Fig. 1, it is clear that the load buses are connected through their impedance units and the tie circuits to form a loop circuit. It will be understood that each of the single-line designations of tie circuits may represent a single circuit or several parallel circuits, as desired.

The advantages of the impedance units in restricting fault currents now may be considered for the entire system illustrated in Fig. 1. Let it be assumed first that the fault F occurs on one of the load circuits associated with the load bus 3. Fault current from the generator 11b tends to flow to the fault through two paths. One of these paths includes the upper half of the winding 9b, as viewed in Fig. 1, and the tie circuit 17. The second path includes the lower half of the impedance unit 9b, the tie circuit 18, the entire winding 9c, the tie circuit 19, the entire winding 9a, the tie circuit 20 and the entire winding 9. Consequently, fault current flowing through the second path is substantially restricted by the impedances of the windings, in addition to the impedances of the tie circuits. More current tends to flow through the upper half of the winding 9b. The excess in this current produces a magnetomotive force which is not compensated by the magnetomotive force produced by the smaller current flowing through the lower half of the winding 9b. Consequently, a substantial impedance is offered to current flowing to the fault through the upper half of the winding 9b.

In a somewhat similar manner, the current supplied to the fault by the generator 11c may be analyzed. The current flowing to the fault through the upper half of the winding 9c, as viewed in Fig. 1, also must pass through the entire winding 9b. Also, current flowing from the generator 11c to the fault through the lower half of the winding 9c must pass through the entire windings 9a and 9. In both cases, substantial impedance is offered by the windings to the flow of fault currents. In addition, if the current supplied by the generator 11c does not divide equally between the two halves of the winding 9c, additional impedance is offered to the larger of the currents flowing through the two halves of the winding. Similar comments apply to fault current supplied by the generator 11a.

A somewhat similar analysis may be made for a fault occurring at any point between an impedance unit and its associated generator. For example, let it be assumed that a fault aF occurs on the feeder circuit extending between the generator 11 and the transformer 15. Current may be supplied to the fault aF from the generator 11b through two paths. The first path includes the upper half of the winding 9b as viewed in Fig. 1, the tie circuit 17 and the upper half of the winding 9. The second path includes the lower half of the winding 9b, the entire winding 9c, the entire winding 9a and the lower half of the winding 9. The impedances of the windings 9c and 9a in the second path materially restrict fault current flowing from the generator 11b therethrough to the fault aF. More current may tend to flow through the first path, but it will be recalled that any unbalance in the currents flowing through the two halves of the windings 9b and 9 introduces a substantial impedance to the flow of the larger current. Consequently, the system materially restricts all fault currents supplied to the fault aF by the generator 11b. Somewhat similar comments apply to the generator 11a. The generator 11c has two paths for supplying current to the fault, but one of these paths includes the impedance of the entire winding 9b and the second path includes the entire impedance of the winding 9a. Consequently, fault current supplied by all of the generators 11a, 11b and 11c to the fault aF is materially limited.

It should be understood that the generator associated with any of the distribution units is available for assisting in the supply of energy to the load buses associated with any of the other distribution units. For example, let it be assumed that the generator 11 is removed from service. Current may be supplied to the load buses 3 and 5 from the generator 11b through two paths. One of these paths includes the lower half of the winding 9b and the entire windings 9a and 9c, and some impedance drop must be expected in these windings. However, it must be understood that the ratio of such impedance to the load impedance associated with the load buses of the distribution unit 1 is much smaller than the ratio of the impedances of the same windings relative to the impedance of the fault aF. Consequently the voltage drops through the windings are less for the case involving only load impedance than they are for the case involving fault impedance. Furthermore, load impedances comprise to a substantial extent a resistance component. The impedance drops through the windings are essentially reactive impedance drops which are in quadrature with the drops produced by the resistive component of the load current. For these reasons, the resultant voltage appearing at the load buses of the distribution unit 1 has a reasonably satisfactory magnitude. Somewhat similar comments apply to the voltage drop in the first path which includes the upper half of the winding 9b.

Several advantages result from the restriction in the fault currents flowing in the system of Fig. 1. The duty on circuit interrupters is materially decreased. This may increase the life of the circuit interrupter, or may permit the utilization of lower-capacity circuit interrupters. In some cases, the invention permits an increase in the number of sources of energy without excessive increase in the magnitude of the fault current permitted to flow in the system. For similar reasons, it is possible in many cases to decrease the length or impedance of tie circuits. By permitting the utilization of more sources of energy, the amount of spare transformer capacity required is materially reduced.

In some cases, it may be desirable to employ balancing transformers 21, 21a, 21b and 21c for the purpose assuring a substantially uniform distribution of load on the transformers 15, 15a, 15b and 15c. The balancing transformers are current transformers which have their secondary windings connected in series. Under normal conditions the voltages induced in the secondary windings are in the same direction relative to the series circuit. Thus, the terminals u of the transformers 21 and 21a are connected together. The terminals v of the transformers 21a and 21c are connected together. The terminals w of the transformers 21c and 21b are connected together, and the terminals x of the transformers 21 and 21b are connected together. If the current transformers are similar and if equal currents flow in the primary windings, the transformer voltages opposing such currents are small and are equal. Any deviation from this condition of equality is accompanied by a change in the primary voltages introduced by the current transformers tending to restore the system to a condition wherein equal currents are supplied by the transformers. Although such balancing transformers are disclosed for the purpose of completeness, it is to be understood that the system is completely operative without such balancing transformers.

Figure 2:
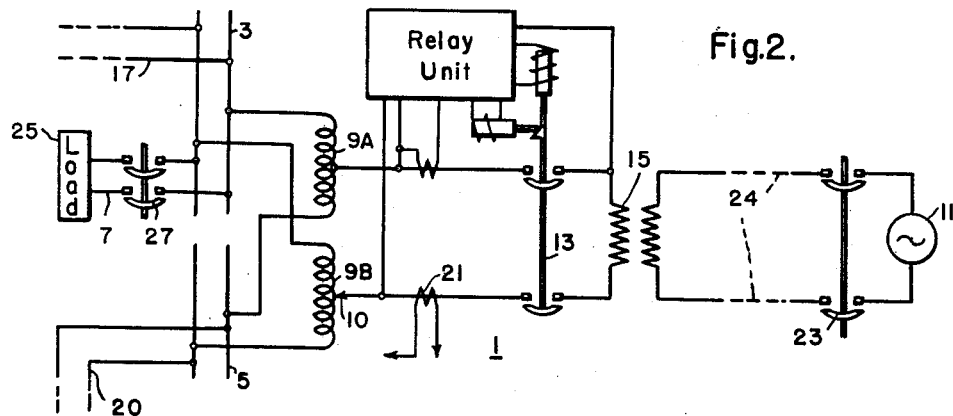
Fig. 2 is a schematic view of a distribution unit suitable for the system of Fig. 1.

The distribution unit 1 is shown in somewhat greater detail in Fig. 2. In Fig. 2, the generator 11 is connected to the transformer 15 through a generator circuit interrupter 23 and a feeder circuit 24. The generator circuit interrupter 23 may be of any conventional construction and may, for example, be designed to trip in response to excessive current flowing from the generator 11 to the feeder circuit 24.

The circuit interrupter 13 may have any suitable control mechanism. Conveniently, the circuit interrupter 13 and the relay unit employed for the control thereof may represent what is known in the art as a network protector. As an example of a suitable network protector, reference may be made to the Parsons Patent 2,082,024.

One terminal of the secondary winding of the transformer 15 is connected to a center tap of a winding 9A. This winding has its terminals connected, respectively, to one conductor of each of the load buses 3 and 5. The remaining terminal of the secondary winding of the transformer 15 may be connected to both of the remaining conductors of the load buses 3 and 5, directly if so desired. However, as shown in Fig. 2, the last-mentioned terminal of the secondary winding is connected to a center tap on a winding 9B which has its terminals connected, respectively, to the remaining conductors of the load buses 3 and 5. Thus, the two windings 9A and 9B correspond to the impedance unit 9 of Fig. 1.

In some cases it may be desirable to employ an unbalanced impedance unit. For example, the impedance unit may be unbalanced to compensate for system unbalances such as those resulting from the provision of different sizes and lengths of tie circuits on other equipment. An impedance unit which may be unbalanced is represented in Fig. 2 wherein the winding 9B has an adjustable mid tap 19. Each of the windings of Fig. 1 may have an adjustable tap if so desired. The unbalance in the impedance unit, if employed, usually would be very small compared to the impedance offered by the impedance unit to fault currents.

For certain applications each impedance unit may be designed to offer any desired predetermined impedance to the flow of equal currents therethrough to the associated load buses. For example, each half of the winding 9A may have a substantial predetermined leakage reactance. The resultant impedance may be desirable to compensate for variations in transformers 15, 15a, etc., or for differences in the impedances of the feeder circuits supplying energy to the transformers.

Also in Fig. 2, a load 25 is shown connected through one of the circuits 7 to the load bus 3. A conventional circuit interrupter 27 may be located between the load and the load bus for the purpose of controlling the connection therebetween.

Figure 3:
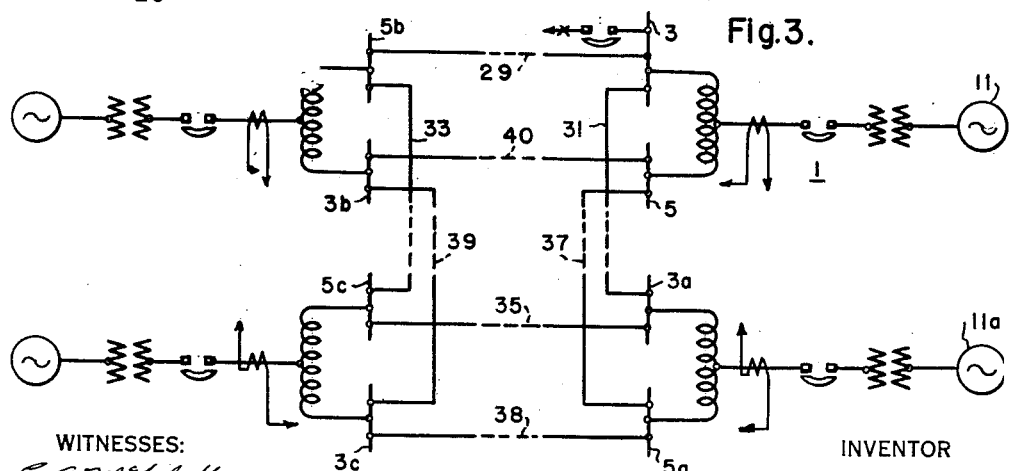
Figs. 3, 4 and 6 are schematic views in single line of electrical distribution systems representing further modifications of the invention.

The system of Fig. 2 may be exactly similar to that of Fig. 1, except for the tie circuits connecting the various load buses. Thus, in Fig. 3, the load bus 3 is connected by a tie circuit 29 to the load bus 5b, and by a tie circuit 31 to the load bus 3a. The load bus 5c is connected by a tie circuit 33 to the load bus 3b and through a tie circuit 35 to the load bus 3a. Consequently a first loop circuit is formed by the load buses 3, 3a, 5b and 5c in association with the tie circuits 29, 31, 35 and 33. In a somewhat similar manner, the load buses 5, 5a, 3c and 3b are associated with tie circuits 37, 38, 39 and 40 to provide a second loop circuit. Thus, each of the sources of electrical energy supplies current in parallel to the two loop circuits of Fig. 3.

Figure 4:
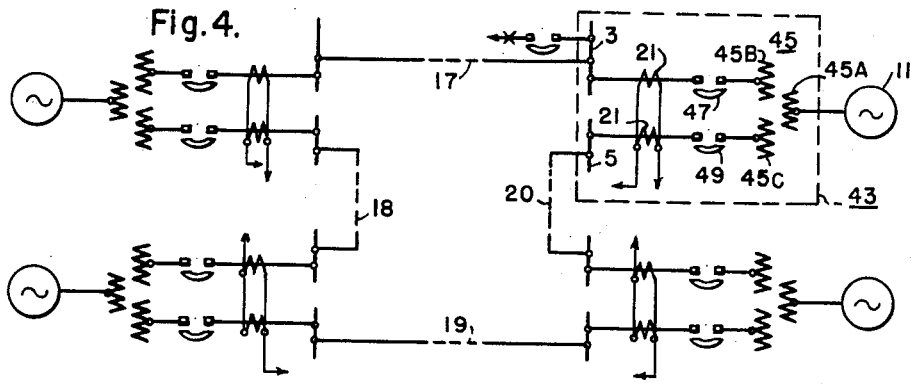

Fig. 4 shows a system which is similar to that of Fig. 1, except for the construction of the distribution units. For example, the distribution unit 1 of Fig. 2 is replaced by the distribution unit 43 of Fig. 4.

Referring to the distribution unit 43 in greater detail, it will be noted that a three-winding transformer 45 is provided for connecting the generator 11 to the load buses 3 and 5 in parallel. The transformer 45 has a primary winding 45A which is connected to the generator 11 for energization therefrom. The transformer has a secondary winding 45B which is connected to the load bus 3 through a suitable circuit interrupter 47. Finally, the transformer 45 has a secondary winding 45C which is connected to the load bus 5 through a circuit interrupter 49. Each of the circuit interrupters 47 and 49 and associated control circuits may be similar to the circuit interrupter 13 (Fig. 1) and the control circuits therefor. However, the circuit interrupters 47 and 49 may have approximately one-half the capacity of the circuit interrupter 13 (Fig. 1) for a given installation.

The three-winding transformer 45 is constructed to provide a low impedance to energy supplied from the generator 11 to the load buses 3 and 5 in parallel. It is designed to have a high impedance between the secondary windings 45B and 45C. The distribution unit 43 is shown in somewhat greater detail in Fig. 5.

Figure 5:
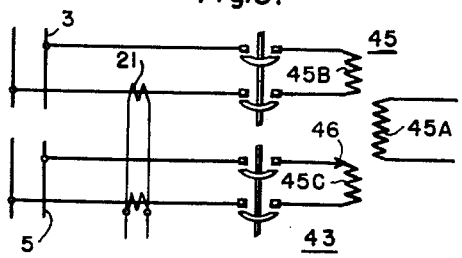
Fig. 5 is a schematic view of a distribution unit suitable for the systems of Figs. 4 and 6.

If desired the secondary windings of the impedance may have adjustable taps as represented in Fig. 5 by the tap 45 on the winding 45C. The taps may be employed to introduce unbalances or compensation in a manner similar to that discussed for the tap 19 of Fig. 2.

Figure 6:
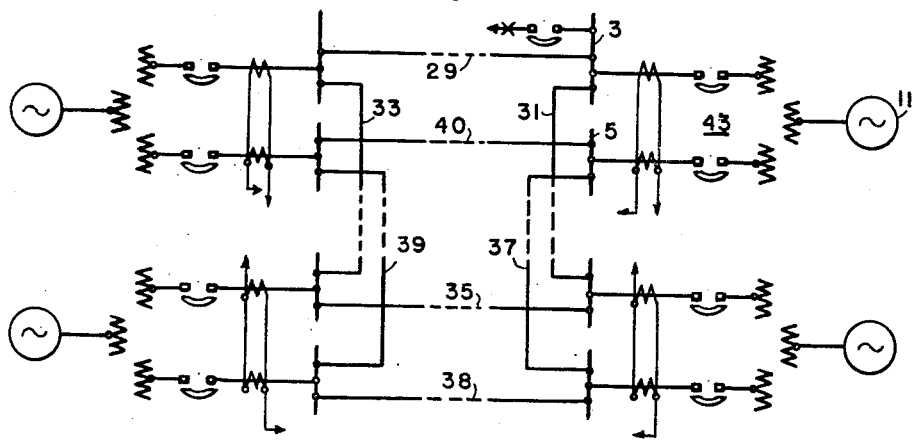

The electrical distribution system of Fig. 6 is similar to that of Fig. 4, except for the tie circuits extending between the load buses. The load buses of Fig. 6 are connected in exactly the same manner as those of Fig. 3. For this reason, it is believed that the construction and operation of the system of Fig. 6 will be understood without further discussion.

I claim as my invention:

1. In an alternating electrical distribution system, at least three spaced impedance units, a plurality of load circuits connected in series with the impedance units to form a loop circuit, at least three sources of alternating energy, and means connecting each of the sources to a separate one of the impedance means for supplying electrical energy in parallel through separate portions of the associated impedance unit to said loop circuit, each of said impedance units offering a substantially larger impedance to current flow therethrough between spaced points on said loop circuit than to the supply of electrical energy in parallel through the separate portions of each of the impedance units to the loop circuit.

2. A system as claimed in claim 1 wherein each of the impedance units comprises a winding having its terminals connected to said load circuits, and having a centrally disposed tap connected to one of said sources.

3. A system as claimed in claim 2 wherein said tap is adjustable for at least one of the impedance units.

4. A system as claimed in claim 1 wherein said separate portions have different impedances.

5. A system as claimed in claim 1 wherein the ratio of the impedances of said portions is adjustable.

6. A system as claimed in claim 1 wherein each of the impedance units comprises a three-winding transformer having a primary winding connected to one of the sources and having a separate secondary winding connected to each of two of said load circuits.

7. In an alternating electrical distribution system, a plurality of pairs of load buses, a plurality of dual-part impedance units, a plurality of sources of alternating energy, means connecting each of said sources through one of said impedance units to a separate one of said pairs of load buses, each of the load buses being connected through a separate part of the associated dual-part impedance unit to the associated source, and a plurality of tie circuits, each of the tie circuits having its terminals connected to only one load bus in each of two of said pairs of buses to form with the load buses and the impedance units a loop circuit.

8. A system as claimed in claim 7, wherein each of the impedance units comprises a winding having terminals connected respectively to the associated load buses, said winding having a centrally disposed tap connected to one of said sources.

9. A system as claimed in claim 7 wherein each of the impedance units comprises a three-winding transformer having a primary winding connected to one of the sources and having a separate secondary winding connected to each of the associated load buses.

10. A system as claimed in claim 7 wherein each of the sources includes a transformer and wherein each of the connecting means includes a circuit interrupter intermediate the associated transformer and the associated impedance unit.

11. In an alternating electrical distribution system, at least three spaced impedance units, a plurality of load circuits connected in series with the impedance units to form a loop circuit operating at load utilization voltage, an electrical load connected directly to one of the load circuits for energization by said load utilization voltage, at least three sources of alternating energy, and means connecting each of the sources to a separate one of the impedance means for supplying electrical energy in parallel through separate portions of the associated impedance unit to said loop circuit, each of said impedance units offering a substantially larger impedance to current flow therethrough between spaced points on said loop circuit than to the supply of electrical energy in parallel through the separate portions of each of the impedance units to the loop circuit, each of the impedance units comprising a three-winding transformer having a primary winding connected to one of the sources, and having a separate secondary winding connected to each of two of said load circuits, at least one of the secondary windings having an adjustable number of turns.

12. In an alternating electrical distribution system, a plurality of pairs of load buses, a plurality of dual-part impedance units, a plurality of sources of alternating energy, means connecting each of said sources through one of said impedance units to a separate one of said pairs of load buses, each of the load buses being connected through a separate part of the associated dual-part impedance unit to the associated source, and a plurality of tie circuits connecting a first load bus of each of said pairs of load buses in series in a first loop circuit, and a tie circuit connecting a second load bus of each of said pairs of load buses in series in a second loop circuit.

WILLIAM W. EDSON.

REFERENCES CITED

The following references are of record in the file of this patent:

UNITED STATES PATENTS

| Number | Name | Date |
| --- | --- | --- |
| 1,814,684 | Gay | July 14, 1931 |
| 1,815,824 | Barton | July 21, 1931 |
| 1,815,842 | Gay | July 21, 1931 |
| 1,896,399 | Gay | Feb. 7, 1933 |
| 1,900,494 | Gay | Mar. 7, 1933 |
| 1,916,925 | Gay | July 4, 1933 |
| 2,168,177 | Stephens | Aug. 1, 1939 |
| 2,300,465 | Parsons | Nov. 3, 1942 |
| 2,321,444 | Woodrow | June 8, 1943 |
| 2,354,138 | Parsons | July 18, 1944 |